(12) United States Patent
Campbell, Jr. et al.

(10) Patent No.: US 6,258,902 B1
(45) Date of Patent: Jul. 10, 2001

(54) OLEFIN POLYMERIZATION PROCESS

(75) Inventors: Richard E. Campbell, Jr.; David D. Devore, both of Midland; Kevin P. Peil, Auburn; Francis J. Timmers, Midland, all of MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/234,831

(22) Filed: Jan. 21, 1999

Related U.S. Application Data

(60) Provisional application No. 60/074,419, filed on Feb. 11, 1998.

(51) Int. Cl.$^7$ .................................................. C08F 2/38
(52) U.S. Cl. ........................ 526/82; 526/90; 526/279; 526/348; 526/351
(58) Field of Search ............... 526/90, 348, 351, 526/82, 279

(56) References Cited

U.S. PATENT DOCUMENTS

| | | | |
|---|---|---|---|
| 4,965,386 | * 10/1990 | Watson et al. | 556/430 |
| 5,272,236 | 12/1993 | Lai et al. | |
| 5,278,272 | 1/1994 | Lai et al. | |
| 5,444,145 | 8/1995 | Brant et al. | |
| 5,525,695 | 6/1996 | Lai et al. | |
| 5,578,690 | * 11/1996 | Marks et al. | 526/347 |
| 5,605,998 | * 2/1997 | Kobayashi et al. | 528/19 |
| 5,665,800 | 9/1997 | Lai et al. | |

FOREIGN PATENT DOCUMENTS

| | | |
|---|---|---|
| 321259 | 6/1989 | (EP) . |
| 739910 | 10/1996 | (EP) . |
| WO 97/42234 | 11/1997 | (WO) . |

OTHER PUBLICATIONS

The Journal of the American Chemical Society, 117, 10747–10748, (1995).

* cited by examiner

Primary Examiner—David W. Wu
Assistant Examiner—Caixia Lu

(57) ABSTRACT

A process for preparing homopolymers and copolymers of addition polymerizable monomers, or mixtures of such monomers, and the resulting polymer, wherein the process comprising contacting said monomer or mixture under high monomer conversion polymerization conditions with a catalyst composition comprising:

a) a catalyst system comprising a Group 3–10 metal complex; and c) a silane, or hydrocarbylsilane corresponding to the formula:

$$J_jSiH_{4-j} \text{ or } A_nJ_jSiH_{4-(n+j)}$$

wherein:
J is $C_{1-40}$ hydrocarbyl,
A is a $C_{2-20}$ alkenyl group,
n is 1 or 2, and
j is 0 or 1;

wherein the polymer comprises from 0.1 to 100 long chain branches per 10,000 carbons, and at least some of which comprise a silane branching center.

3 Claims, No Drawings

OLEFIN POLYMERIZATION PROCESS

CROSS REFERENCE STATEMENT

This application claims the benefit of U.S. Provisional No. 60/074,419, filed Feb. 11, 1998.

BACKGROUND OF THE INVENTION

The present invention relates to a process for polymerizing addition polymerizable monomers, such as ethylene or propylene, or combinations of one or more olefin monomers such as combinations of ethylene with one or more $C_{3-8}$ α-olefins, and optionally one or more copolymerizable dienes to produce polymers having a high degree of long chain branching (LCB) using a catalyst composition comprising a Group 3–10 metal complex and a silane or hydrocarbylsilane branching agent. The resulting polymers may be usefully employed in the preparation of solid objects and articles such as a moldings, films, sheets and foamed objects by molding, casting or the like process.

In WO 97/42234 there is disclosed a process for the preparation of polymers of vinylidene aromatic monomers having a stereoregular structure of high syndiotacticity, by the use of Group 4 metal coordination catalysts and a hydrocarbylsilane or dihydrocarbylsilane adjuvant. In *Journal of the American Chemical Society*, 1995, 117, 10747–19748, the use of silanes as chain transfer agents in metallocene-mediated olefin polymerizations was described. The products formed included silyl terminated polyolefins.

In U.S. Pat. Nos. 5,272,236, 5,278,272, 5,525,695 there are disclosed certain ethylene homopolymers and ethylene/α-olefin copolymers having a LCB of at least 3 chains per 10,000 carbons and a process for their preparation wherein the reincorporation of in situ generated vinyl terminated oligomers or polymers into the growing polymer chain, especially by means of a continuous polymerization process is disclosed. Although such process is relatively efficient for preparing ethylene homopolymers and copolymers, it is not particularly efficient or possible for use for forming long chain branches in homopolymers of $C_{3-8}$ α-olefins, or copolymers of mixtures of $C_{3-8}$ α-olefins. In U.S. Pat. No. 5,665,800 the above process was utilized to prepare EPDM compolymers having melt flow ratio, I10/I2 greater than 5.63, a molecular weight distribution, Mw/Mn, defined by the equation: Mw/Mn <(I10/I2)-4.63, and a critical shear stress at onset of gross melt fracture of greater than about $4 \times 10^6$ dynes/cm$^2$. Generally increased long chain branching content is desired in olefin polymers due to improved melt rhelogy of the resulting polymer.

In U.S. Pat. No. 5,444,145, copolymers of ethylene and a branched olefin monomer are disclosed. Disadvantageously, the preparation of such copolymers by the use of the foregoing technique requires the use of a relatively expensive olefin, containing the desired preformed branched structure. Such a process is relatively inflexible and unsuited for commercial use. A process for forming long chain branched α-olefin copolymer products which may utilize normal, e.g. unbranched olefin monomers is still desired in the industry. For the teachings contained therein, the foregoing patents, publications and equivalent United States patent applications are hereby incorporated by reference.

SUMMARY OF THE INVENTION

According to the present invention there is now provided a process for preparing homopolymers and copolymers of addition polymerizable monomers, or mixtures of such monomers, the process comprising contacting said monomer or mixture under high monomer conversion polymerization conditions with a catalyst composition comprising:

a) a catalyst system comprising a Group 3–10 metal complex; and c) a silane compound corresponding to the formula:

wherein:

J is $C_{1-40}$ hydrocarbyl,

A is a $C_{2-20}$ alkenyl group, n is 1 or 2, and j is 0 or 1;

wherein the polymer comprises from 0.1 to 100 long chain branches per 10,000 carbons, at least some of which comprise a silane branching center.

Compared to a polymerization process utilizing a similar catalyst composition that lacks the aforementioned silane branching agents, the present process achieves a significantly improved efficiency in long chain branch generation. In addition, the present process may be utilized in the polymerization of monomers that are not amenable to reincorporation of the products of β-hydride elimination, thereby allowing preparation for the first time of polymers containing long chain branching from such monomers. Because of the multiple reactive sites contained in the alkenyl substituted silane the quantity of the silane necessary to achieve the desired branching is small and depending on polymerization conditions rarely exceeds 5 weight percent of the reaction mixture. Use of excess alkenyl- substituted silane can result in the formation of a cross-linked polymer.

All reference to the Periodic Table of the Elements herein shall refer to the Periodic Table of the Elements, published and copyrighted by CRC Press, Inc., 1995. Also, any reference to a Group or Series shall be to the Group or Series as reflected in this Periodic Table of the Elements, utilizing the IUPAC system for numbering groups.

Preferred silane or hydrocarbylsilane branching agents used herein include SiH$_4$, methylsilane, ethylsilane, n-butylsilane, octadecylsilane, phenylsilane and benzylsilane. Mixtures of the foregoing silanes may also be used. While SiH$_4$ is a gas and is readily added to modern polymerization processes and subsequently removed from the reaction mixture by devolatilization, the aryl silanes, especially, phenyl silane or benzylsilane, are more reactive under the present polymerization conditions, and accordingly are more efficient in forming long chain branches.

Preferred alkenyl substituted silane branching agents used herein include ethenylsilane, 3-butenylsilane, 5-hexenylsilane, vinycyclohexenylisilane, 7-octenylsilane, 17-octadecenylsilane 3-butenyl methylsilane, 7-octenyl ethylsilane, ethenyl n-butylsilane, 7-octenyl octadecylsilane, 3-butenyl phenylsilane and 7-octenyl benzylsilane. Mixtures of the foregoing silanes may also be used. Although the alkenyl silanes are preferably terminally unsaturated, alkenyl silanes containing internal unsaturated bonds, such as, 6-octenylsilane, can also be employed as long chain branching agents in the present invention. The alkenylsilanes employed to form the novel polymers of the present invention are obtained by the addition reaction of a diene, such as octadiene, to silane or a hydrocarbyl-substituted silane under conditions well known to those skilled in the art.

As used herein the term "long chain branching" refers to pendant oligomeric, hydrocarbyl groups attached to a polymeric chain, which groups have a carbon length of six or greater but are not the result of deliberately added comonomer polymerization, e.g., propene, 1-butene, 1-hexene, 1-octene, or branched olefin polymerization. Long chain branching in the present context includes polymer branches resulting from the reincorporation of remnants resulting from the β-hydride elimination process, with or without the involvement of the silane. Such long chain branches furthermore reflect the monomer diversity present in the polymerization reactor, since in effect, they are portions of preformed polymer which are reincorporated into a growing polymer chain.

Several techniques for measuring the extent of long chain branching in a copolymer already exist. Principle analytical techniques include those based on $^{13}C$ NMR analysis, optionally coupled with low angle laser light scattering or similar particle size measuring technique. Additionally, it is possible to arrive at an estimate of short chain branches, i.e., branches due to the $C_{3-8}$ comonomer remnant, by preparation of a control copolymer using a labled monomer, such as $^{13}C$ enriched 1-octene or ethylene, under the assumption that a similar level of branch distribution will exist in copolymers made under comparative conditions utilizing unmodified monomers. The level of longchain branching is thereafter determinded by subtraction. In the present technique, the level of long chain branching may additionally be quantified from a knowledge of the silane branching centers present in the resulting copolymer, determined, for example, by NMR, in addition to any conventional long chain branching that may arise due to the foregoing continuous high conversion process technique. Preferred polymers according to the present invention contain from 0.3 to 10 long chain branches per 10,000 carbons.

The incidence of long chain branching can be increased by careful control of processing conditions. For example, the use of a continuous, solution polymerization process (in which reactants and catalyst are continuously added to a polymerization reactor and product is continuously removed therefrom) operating at high conversion conditions favors long chain branch incorporation due to a relative increased molar concentration of in situ generated long chain, vinyl terminated monomer. Additionally, process conditions resulting in high local concentrations of β-hydride elimination products, for example gas phase polymerization processes, also favor long chain branch formation.

In the present process and products, some of the long chain branches are the result of successive Si-H bond metathesis reactions involving the active catalyst center, the growing polymer chain, and the silane. This is an iterative process requiring at least three interactions with the silane branching agent which may be depicted as follows:

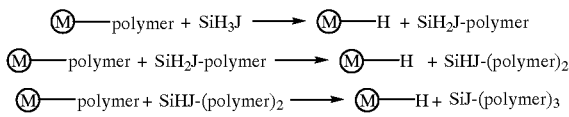

wherein  indicates the active catalyst site bonded to a growing polymer chain or to hydrogen, and J is as previously defined. The resulting polymers uniquely contain silane, long chain branching centers. It may also be readily seen that $SiH_4$ long chain branching agent is capable of one additional metathesis reaction in the above scheme, which would generate a novel tertiary substituted silane long chain center. In addition to the effect on long chain branching achieved according to the present invention, the silane or hydrocarbyl silane branching agent may affect the polymerization process thereby resulting in polymer molecular weight reduction.

Additionally, the chain branching process is further enhance by the presence of the ethylenically unsaturated functional group of the alkenyl substituted silane, if present, which is capable of becoming either part of the main polymer chain or part of a long chain branch. The reaction of the remaining Si—H functionality of such alkenyl substituted silane compounds is as previously depicted.

Suitable metal complexes for use herein include any complex of a metal of Groups 3–10 of the Periodic Table of the Elements capable of polymerizing or being activated to polymerize the foregoing addition polymerizable compounds, especially olefins. Examples include Group 10 diimine derivatives corresponding to the formula:

$$\begin{pmatrix} N \\ \diagdown \\ \diagup \\ N \end{pmatrix} M^*X'_2 A^-$$

Wherein,

M* is Ni(II) or Pd(II);

X' is halo, hydrocarbyl, or hydrocarbyloxy;

Ar* is an aryl group, especially 2,6-diisopropylphenyl or aniline group;

the two nitrogen atoms are linked by a divalent bridging group of up to 60 atoms other than hydrogen, in particular, a 1,2-ethanediyl, 2,3-butanediyl, dimethylenesilane group, or a fused ring system, such as 1,8-naphthanediyl; and A is the anionic component of the foregoing charge separated activators.

The foregoing complexes are disclosed by M. Brookhart, et al., in *J. Am. Chem. Soc.,* 118, 267–268(1996), *J. Am. Chem. Soc.,* 117, 6414–6415 (1995), and J. Feldman et al., *Organometallics,* 1997,16,1514–1516, as being active polymerization catalysts especially for polymerization of α-olefins, either alone or in combination with polar comomoners such as vinyl chloride, alkyl acrylates and alkyl methacrylates.

Additional complexes include derivatives of Group 3, 4, or Lanthanide metals containing from 1 to 3 π-bonded anionic or neutral ligand groups, which may be cyclic or non-cyclic delocalized π-bonded anionic ligand groups. Exemplary of such π-bonded anionic ligand groups are conjugated or nonconjugated, cyclic or non-cyclic dienyl groups, allyl groups, boratabenzene groups, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted metalloid radicals wherein the metalloid is selected from Group 14 of the Periodic Table of the Elements, and such hydrocarbyl- or hydrocarbyl-substituted metalloid radicals further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 hetero atom containing moieties include amine, phosphine, ether or thioether moieties or divalent derivatives thereof, e. g. amide, phosphide, ether or thioether groups bonded to the transition metal or Lanthanide metal, and bonded to the hydrocarbyl group or to the hydrocarbyl- substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, and boratabenzene groups, as well as $C_{1-10}$ hydrocarbyl-substituted or $C_{1-10}$ hydrocarbyl-substituted silyl substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

The boratabenzenes are anionic ligands which are boron containing analogues to benzene. They are previously known in the art having been described by G. Herberich, et al., in *Organometallics*, 14,1, 471–480 (1995). Preferred boratabenzenes correspond to the formula:

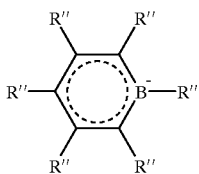

wherein R" is selected from the group consisting of hydrocarbyl, silyl, N,N-dialkylamino, N,N-diarylamino, or germyl, said R" having up to 20 non-hydrogen atoms. In complexes involving divalent derivatives of such delocalized π-bonded groups one atom thereof is bonded by means of a covalent bond or a covalently bonded divalent group to another atom of the complex thereby forming a bridged system.

A suitable class of catalysts are transition metal complexes corresponding to the formula:

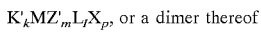

wherein:
K' is an anionic group containing delocalized π-electrons through which K' is bound to M, said K' group containing up to 50 atoms not counting hydrogen atoms, optionally two K' groups may be joined together forming a bridged structure, and further optionally one K' may be bound to Z';

M is a metal of Group 4 of the Periodic Table of the Elements in the +2, +3 or +4 formal oxidation state;

Z' is an optional, divalent substituent of up to 50 non-hydrogen atoms that together with K' forms a metallocycle with M;

L is an optional neutral ligand having up to 20 non-hydrogen atoms;

X each occurrence is a monovalent, anionic moiety having up to 40 non-hydrogen atoms, optionally, two X groups may be covalently bound together forming a divalent dianionic moiety having both valences bound to M, or, optionally 2 X groups may be covalently bound together to form a neutral, conjugated or non-conjugated diene that is bound to M by means of delocalized π-electrons (whereupon M is in the +2 oxidation state), or further optionally one or more X and one or more L groups may be bonded together thereby forming a moiety that is both covalently bound to M and coordinated thereto by means of Lewis base functionality;

k is 0, 1 or 2; m is 0 or 1; l is a number from 0 to 3; p is an integer from 0 to 3; and the sum, k+m+p, is equal to the formal oxidation state of M, except when 2 X groups together form a neutral conjugated or non-conjugated diene that is bound to M via delocalized π-electrons, in which case the sum k+m is equal to the formal oxidation state of M.

Preferred complexes include those containing either one or two K' groups. The latter complexes include those containing a bridging group linking the two groups. Preferred bridging groups are those corresponding to the formula $(ER'_2)_x$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and x is 1 to 8. Preferably, R' independently each occurrence is methyl, ethyl, propyl, benzyl, tert-butyl, phenyl, methoxy, ethoxy or phenoxy.

Examples of the complexes containing two K' groups are compounds corresponding to the formula:

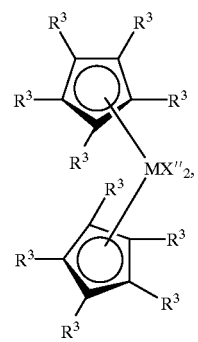

(I)

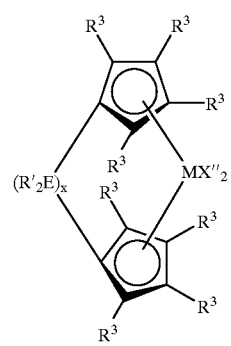

(II)

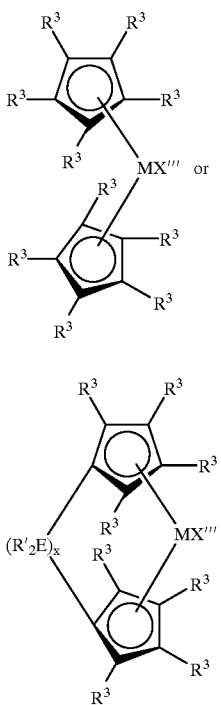

wherein:
M is titanium, zirconium or hafnium, preferably zirconium or hafnium, in the +2, +3, or +4 formal oxidation state;

$R^3$ in each occurrence independently is selected from the group consisting of hydrocarbyl, silyl, germyl, halo, halohydrocarbyl, hydrocarbyloxy, hydrocarbylsiloxy, N,N-di(hydrocarbylsilyl)amino, N-hydrocarbyl-N-silylamino, N, N-di(hydrocarbyl)amino, hydrocarbyleneamino, di(hydrocarbyl)phosphino, hydrocarbylsulfido; or hydrocarbyloxy-substituted hydrocarbyl,, said $R^3$ having up to 20 non-hydrogen atoms, or adjacent $R^3$ groups together form a divalent derivative thereby forming a fused ring system, and X" independently each occurrence is an anionic ligand group of up to 40 non-hydrogen atoms, or two X" groups together form a divalent anionic ligand group of up to 40 non-hydrogen atoms, X''' independently each occurrence is a stabilizing anionic ligand group selected from 2-(N,N-dimethylaminobenzyl), m-(N,N-dimethylaminomethyl)phenyl, allyl, and $C_{1-10}$ hydrocarbyl substituted allyl, whereupon M is in the +3 formal oxidation state, or X"' independently each occurrence is a neutral, conjugated diene, or a silyl, germyl, or halohydrocarbyl substituted derivative thereof, having up to 40 atoms other than hydrogen, whereupon M is in the +2 formal oxidation state, E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and x is 1 to 8.

The foregoing metal complexes are especially suited for the preparation of polymers having stereoregular molecular structure. In such capacity it is preferred that the complex possesses $C_s$ symmetry or possesses a chiral, stereorigid structure. Examples of the first type are compounds possessing different delocalized π-bonded ligand groups, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.* 110, 6255–6256 (1980). Examples of chiral structures include rac bis-indenyl complexes. Similar systems based on Ti(IV) or Zr(IV) were disclosed for preparation of isotactic olefin polymers in Wild et al., *J. Organomet. Chem.*, 232, 233–47, (1982).

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl(cyclopentadienyl) (octahydrofluoren-1-yl)silane, dimethyl(cyclopentadienyl)(tetrahydrofluoren-1-yl)silane, (1,1,2,2-tetramethy)-1,2-bis(cyclopentadienyl)disilane, (1,2-bis(cyclopentadienyl)ethane, and dimethyl (cyclopentadienyl)-1-(fluoren-1-yl)methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative. Most preferred X" groups are $C_{1-20}$ hydrocarbyl groups.

Preferred X"' groups are 1,3-pentadiene, and 1,4-diphenylbutadiene.

A further class of metal complexes utilized in the present invention corresponds to the preceding formula $K'_kMZ'_mL_nX_p$, or a dimer thereof, wherein Z' is a divalent substituent of up to 50 non-hydrogen atoms that together with K' forms a metallocycle with M.

Preferred divalent Z' substituents include groups containing up to 30 non-hydrogen atoms comprising at least one atom that is oxygen, sulfur, boron or a member of Group 14 of the Periodic Table of the Elements directly attached to K', and a different atom, selected from the group consisting of nitrogen, phosphorus, oxygen or sulfur that is covalently bonded to M.

A preferred class of such Group 4 metal coordination complexes used according to the present invention corresponds to the formula:

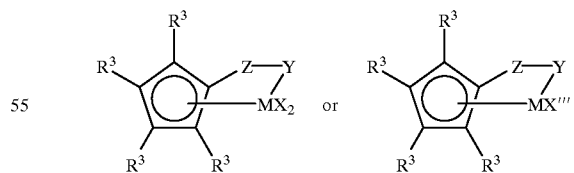

wherein:
M is titanium or zirconium;

$R^3$ in each occurrence independently is selected from the group consisting of hydrocarbyl, silyl, germyl, halo, halohydrocarbyl, hydrocarbyloxy, hydrocarbylsiloxy, N,N-di (hydrocarbylsilyl)amino, N-hydrocarbyl-N-silylamino, N ,N-di (hydrocarbyl)amino, hydrocarbyleneamino, di(hydrocarbyl)phosphino, hydrocarbylsulfido; or hydrocarbyloxy-substituted hydrocarbyl, said $R^3$ having up to 20 non-hydrogen atoms, or adjacent $R^3$ groups together form a divalent derivative thereby forming a fused ring system, each X is a halo, hydrocarbyl, hydrocarbyloxy or silyl group, said group having up to 20 non-hydrogen atoms, or two X groups together form a divalent derivative thereof;

X''' is a neutral, conjugated diene, or a silyl, germyl, or halohydrocarbyl substituted derivative thereof, having up to 40 atoms other than hydrogen, whereupon M is in the +2 formal oxidation state, Y is —O—, —S—, —NR'—, or —PR'—, and Z is $SiR'_2$, $CR'_2$, $SiR'_2SiR'_2$, $CR'_2CR'_2$, $CR'=CR'$, $CR'_2SiR'_2$, or $GeR'_2$, wherein R' independently each occurrence is hydrogen or a group selected from silyl, hydrocarbyl, hydrocarbyloxy and combinations thereof, said R' having up to 30 carbon or silicon atoms.

Additional suitable complexes correspond to the formula:

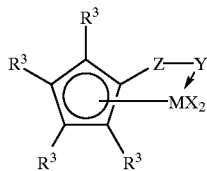

wherein:

M is titanium or zirconium, preferably titanium in the +3 formal oxidation state;

$R^3$ in each occurrence independently is selected from the group consisting of hydrocarbyl, silyl, germyl, halo, halohydrocarbyl, hydrocarbyloxy, hydrocarbylsiloxy, N,N-di (hydrocarbylsilyl)amino, N-hydrocarbyl-N-silylamino, N,N-di(hydrocarbyl)amino, hydrocarbyleneamino, di(hydrocarbyl)phosphino, hydrocarbylsulfido; or hydrocarbyloxy-substituted hydrocarbyl, said $R^3$ having up to 20 non-hydrogen atoms, or adjacent $R^3$ groups together form a divalent derivative thereby forming a fused ring system, each X is a halo, hydrocarbyl, hydrocarbyloxy or silyl group, said group having up to 20 non-hydrogen atoms, or two X groups together form a divalent derivative thereof;

E is silicon, germanium, tin, or carbon,

R' independently each occurrence is hydrogen or a group selected from silyl, hydrocarbyl, hydrocarbyloxy and combinations thereof, said R' having up to 30 carbon or silicon atoms, x is 1 to 8, Y is —OR, or —$NR_2$; and Z is $SiR'_2$, $CR'_2$, $SiR'_2SiR'_2$, $CR'_2CR'_2$, $CR'=CR'$, $CR'_2SiR'_2$, or $GeR'_2$, wherein R' is as previously defined.

Additional suitable complexes correspond to the formula:

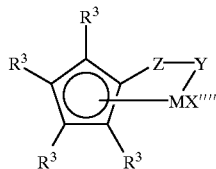

wherein:

M is titanium or zirconium, preferably titanium in the +3 formal oxidation state;

$R^3$ in each occurrence independently is selected from the group consisting of hydrocarbyl, silyl, germyl, halo, halohydrocarbyl, hydrocarbyloxy, hydrocarbylsiloxy, N,N-di(hydrocarbylsilyl)amino, N-hydrocarbyl-N-silylamino, N,N-di(hydrocarbyl)amino, hydrocarbyleneamino, di(hydrocarbyl)phosphino, hydrocarbylsulfido; or hydrocarbyloxy-substituted hydrocarbyl, said $R^3$ having up to 20 non-hydrogen atoms, or adjacent $R^3$ groups together form a divalent derivative thereby forming a fused ring system, X'''' is 2-(N,N-dimethylaminobenzyl), m-(N,N-dimethylaminomethyl)phenyl, allyl, and $C_{1-10}$ hydrocarbyl substituted allyl;

Y is —O—, —S—, —NR'—, or —PR'—, and

Z is $SiR'_2$, $CR'_2$, $SiR'_2SiR'_2$, $CR'_2CR'_2$, $CR'=CR'$, $CR'_2SiR'_2$, or $GeR'_2$, wherein R' is as previously defined.

Illustrative Group 4 metal complexes that may be employed in the practice of the present invention include:

biscyclopentadienyl complexes such as:
bis(cyclopentadienyl)zirconium dichloride,
bis(cyclopentadienyl)zirconium dimethyl,
bis(t-butylcyclopentadienyl)zirconium dichloride,
bis(t-butylcyclopentadienyl)zirconium dimethyl,
(fluorenyl)(cyclopentadienyl)zirconium dichloride,
(fluorenyl)(cyclopentadienyl)zirconium dimethyl,
bis(indenyl)zirconium dichloride,
bis(indenyl)zirconium dimethyl,
rac-dimethylsilane-bis(cyclopentadienyl)zirconium dichloride,
rac-dimethylsilane-bis(cyclopentadienyl)zirconium dimethyl,
rac-dimethylsilane-bis(tetramethylcyclopentadienyl) zirconium dichloride,
rac-dimethylsilane-bis(tetramethylcyclopentadienyl) zirconium dimethyl,
rac-dimethylsilane-bis{1-(2-methyl-4-phenylindenyl) }zirconium dichloride,
rac-dimethylsilane-bis{1-(2-methyl-4-(α-naphthyl)indenyl) }zirconium dichloride,
rac-dimethylsilane-bis{1-(2-methyl-4-(β-naphthyl) indenyl}zirconium dichloride,
rac-1,2-ethylene-bis{1-(2-methyl-4-phenylindenyl) }zirconium dichloride,
rac-1,2-ethylene-bis{1-(2-methyl-4-(α-naphthyl)indenyl) }zirconium dichloride,
rac-dimethylsilane-bis(cyclopentadienyl)zirconium(II) 1,4-diphenyl-1,3-butadiene,
rac-dimethylsilane-bis(cyclopentadienyl)zirconium(II) 2,4-hexadiene,
rac-dimethylsilane-bis{1-(2-methyl-4-phenylindenyl) }zirconium(II) 1,3-pentadiene, rac-dimethylsilane-bis{1-(2-methyl-4-(α-naphthyl)indenyl)}zirconium(II) 1,3-pentadiene,
rac-1,2-ethylene-bis{1-(2-methyl-4-phenylindenyl)}zirconium(II) 1,3-pentadiene,
rac-1,2-ethylene-bis{1-(2-methyl-4-(α-naphthyl)indenyl)}zirconium(II) 1,3-pentadiene,
rac-1,2-ethylene-bis{1-(2-methyl-4-(β-naphthyl)indenyl)}zirconium(II) 1,3-pentadiene,
rac-1,2-ethylene-bis{1-(2-methyl-4-(1-anthracenyl)indenyl)}zirconium(II) 1,3-pentadiene,
rac-1,2-ethylene-bis{1-(2-methyl-4-(2-anthracenyl)indenyl)}zirconium(II) 1,3-pentadiene,
rac-1,2-ethylene-bis{1-(2-methyl-4-(9-anthracenyl)indenyl)}zirconium(II) 1,3-pentadiene,
rac-1,2-ethylene-bis{1-(2-methyl-4-(9-phenanthryl)indenyl)}zirconium(II) 1,3-pentadiene,
rac-1,2-ethylene-bis{1-(2-methyl-4-phenylindennyl)}zirconium(II)1,4-diphenyl-1,3-butadiene,
rac-1,2-ethylene-bis{1-(2-methyl-4-(α-naphthyl)indenyl)}zirconium(II) 1,4-diphenyl-1,3-butadiene, and
rac-1,2-ethylene-bis{1-(2-methyl-4-(β-naphthyl)indenyl}zirconium(II) 1,4-diphenyl-1,3-butadiene Examples of metal complexes containing a single cyclic ligand containing delocalized π-electrons and a bridging structure to the metal (known as constrained geometry complexes) used in the present invention wherein the metal is in the +4 formal oxidation state include the following complexes:

(tert-butylamido)(tetramethylcyclopentadienyl) dimethylsilanetitanium dichloride,
(cyclohexylamido)(tetramethylcyclopentadienyl) dimethylsilanetitanium dichloride,
(cyclododecylamido)(tetramethylcyclopentadienyl) dimethylsilanetitanium dichloride,
(tert-butylamido)(2-methyl-4-phenylinden-1-yl) dimethylsilanetitanium dichloride,
(tert-butylamido)(3-pyrrolylinden-1-yl) dimethylsilanetitanium dichloride,
(cyclohexylamido)(3-pyrrolylinden-1-yl) dimethylsilanetitanium dichloride,
(tert-butylamido)($\eta^5$-3phenyl-s-indacen-1-yl) dimethylsilanetitanium dichloride,
(tert-butylamido)($\eta^5$-2-methyl-3-biphenyl-s-indacen-1-yl) dimethylsilanetitanium dichloride,
(tert-butylamido)($\eta^5$-3-phenyl-gem-dimethylacenaphthalen-1-yl)dimethylsilanetitanium dichloride,
(tert-butylamido)(tetramethylcyclopentadienyl) dimethylsilanetitanium dimethyl,
(cyclohexylamido)(tetramethylcyclopentadienyl) dimethylsilanetitanium dimethyl,
(cyclododecylamido)(tetramethylcyclopentadienyl) dimethylsilanetitanium dimethyl,
(tert-butylamido)(2-methyl-4-phenylinden-1-yl) dimethylsilanetitanium dimethyl,
(tert-butylamido)(3-pyrrolylinden-1-yl) dimethylsilanetitanium dimethyl,
(cyclohexylamido)(3-pyrrolylinden-1-yl) dimethylsilanetitanium dimethyl,
(tert-butylamido)($\eta^5$-3-phenyl-s-indacen-1-yl) dimethylsilanetitanium dimethyl,
(tert-butylamido)($\eta^5$-2-methyl-3-biphenyl-s-indacen-1-yl) dimethylsilanetitanium dimethyl,
(tert-butylamido)($\eta^5$-3-phenyl-gem-dimethylacenaphthalen-1yl)dimethylsilanetitanium dimethyl,
(tert-butylamido)(tetramethylcyclopentadienyl) dimethylsilanetitanium 1,4-diphenyl-1,3-butadiene,
(cyclohexylamido)(tetramethylcyclopentadienyl) dimethylsilanetitanium 1,4-diphenyl-1,3-butadiene,
(cyclododecylamido)(tetramethylcyclopentadienyl) dimethylsilanetitanium 1,4-diphenyl-1,3-butadiene,
(tert-butylamido)(2-methyl-4-phenylinden-1-yl) dimethylsilanetitanium 1,4-diphenyl-1,3-butadiene,
(tert-butylamido)(3-pyrrolylinden-1-yl) dimethylsilanetitanium 1,4-diphenyl-1,3-butadiene,
(cyclohexylamido)(3-pyrrolylinden-1-yl) dimethylsilanetitanium 1,4-diphenyl-1,3-butadiene,
(tert-butylamido) ($\eta^5$-3-phenyl-s-indacen-1-yl) dimethylsilanetitanium 1,4-diphenyl-1,3-butadiene,
(tert-butylamido)($\eta^5$-2-methyl-3-biphenyl-s-indacen-1-yl) dimethylsilanetitanium 1,4-diphenyl-1,3 butadiene,
(tert-butylamido)($\eta^5$-3-phenyl-gem-dimethylacenaphthalen-1yl)dimethylsilanetitanium 1,4-diphenyl-1,3-butadiene,
(tert-butylamido)(tetramethylcyclopentadienyl) dimethylsilanetitanium 1,3-pentadiene,
(cyclohexylamido)(tetramethylcyclopentadienyl) dimethylsilanetitanium 1,3-pentadiene,
(cyclododeylamido)(tetramethylcyclopentadienyl) dimethylsilanetitanium 1,3-pentadiene,
(tert-butylamido)(2-methyl-4-phenylinden-1-yl) dimethylsilanetitanium 1,3-pentadiene,
(tert-butylamido)(3-pyrrolylinden-1-yl) dimethylsilanetitanium 1,3-pentadiene,
(cyclohexylamido)(3-pyrrolylinden-1-yl) dimethylsilanetitanium 1,3-pentadiene,
(tert-butylamido)($\eta^5$-3-phenyl-s-indacen-1-yl) dimethylsilanetitanium 1,3-pentadiene, and
(tert-butylamido)($\eta^5$-2-methyl-3-biphenyl-s-indacen-1-yl) dimethylsilanetitanium 1,3-pentadiene.

Other complexes, especially those containing other Group 4 metals, will, of course, be apparent to those skilled in the art.

The preferred Group 4 metal complexes are rendered catalytically active by combination with an activating cocatalyst or by use of an activating technique. Suitable activating cocatalysts for use herein include polymeric or oligomeric alumoxanes, especially methylalumoxane, tri-isobutyl aluminum modified methylalumoxane, diisobutylalumoxane or perfluoroaryl modified alumoxane; strong Lewis acids, such as $C_{1-30}$ hydrocarbyl substituted Group 13 compounds, especially tri(hydrocarbyl)aluminum- or tri (hydrocarbyl)boron- compounds and halogenated derivatives thereof, having from 1 to 10 carbons in each hydrocarbyl or halogenated hydrocarbyl group, especially tris (pentafluorophenyl)borane; and nonpolymeric, inert, compatible, noncoordinating, ion forming compounds (including the use of such compounds under oxidizing conditions). A suitable activating technique is bulk electrolysis (explained in more detail hereinafter). Combinations of the foregoing activating cocatalysts and techniques may also be employed if desired. The foregoing activating cocatalysts and activating techniques have been previously taught with respect to different metal complexes in the following references: EP-A-277,003, U.S. Pat. Nos. 5,153,157, 5,064,802, EP-A-468,651, EP-A-520,732, and WO093/23412.

Suitably, polymeric or oligomeric alumoxanes, when used, are present in a molar amount compared to metal complex from 10:1 to 1000:1, preferably from 50:1 to 200:1. Aluminoxanes, or alkylaluminoxanes, are generally believed to be oligomeric or polymeric alkylaluminoxy compounds, including cyclic oligomers. Generally such compounds contain, on average about 1.5 alkyl groups per aluminum atom, and are prepared by reaction of trialkylaluminum compounds or mixtures of compounds with water. Perfluoroaryl substituted alumoxanes are readily prepared by combining an alkylalumoxane, which may also contain residual quantities of trialkylaluminum compound, with a fluoroaryl ligand source, preferably a strong Lewis acid containing fluoroaryl ligands, followed by removing byproducts formed by the ligand exchange. Preferred fluoroaryl ligand sources are trifluoroarylboron compounds, most preferably tris(pentafluorophenyl)boron, which result in trialkylboron ligand exchange products, that are relatively volatile and easily removable from the reaction mixture.

The reaction may be performed in any aliphatic, alicyclic or aromatic liquid diluent or mixture thereof. Preferred are $C_{6-8}$ aliphatic and alicyclic hydrocarbons and mixtures thereof, including hexane, heptane, cyclohexane, and mixed fractions such as Isopar™ E, available from Exxon Chemicals Inc. After contacting of the alkylalumoxane and source of fluoroaryl ligand the reaction mixture may be purified to remove ligand exchange products, especially any trialkylboron compounds by any suitable technique. Alternatively, the Group 3–10 metal complex catalyst may first be combined with the reaction mixture prior to removing the residual ligand exchange products.

Suitable techniques for removing alkyl exchange byproducts from the reaction mixture include degassing optionally at reduced pressures, distillation, solvent exchange, solvent extraction, extraction with a volatile agent, contacting with a zeolite or molecular sieve, and combinations of the foregoing techniques, all of which are conducted according to conventional procedures. Purity of the resulting product may be determined by $^{13}B$ NMR of the resulting product. Preferably the quantity of residual alkyl exchange product is less than 10 weight percent, based on solids content, preferably less than 1.0 weight percent, most preferably less than 0.1 weight percent.

Suitable nonpolymeric, inert, compatible, noncoordinating, ion forming compounds useful as cocatalysts in one embodiment of the present invention comprise a cation which is a Bronsted acid capable of donating a proton, and a compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

$$(L^*-H)^+_d A^{d-}$$

wherein:

L* is a neutral Lewis base;

$(L^*-H)^+$ is a Bronsted acid;

$A^{d-}$ is a noncoordinating, compatible anion having a charge of d–, and d is an integer from 1 to 3.

More preferably d is one, that is, $A^{d-}$ is $A^-$.

Highly preferably, $A^-$ corresponds to the formula:

$[BQ_4]^-$ wherein:

B is boron in the +3 formal oxidation state; and

Q independently each occurrence is selected from hydride, dialkylamido, halide, alkoxide, aryloxide, hydrocarbyl, halocarbyl, and halosubstituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most preferably, a fluorinated aryl group, especially, pentafluorophenyl.

Illustrative, but not limiting, examples of ion forming compounds comprising proton donatable cations which may be used as activating cocatalysts in the preparation of the catalysts of this invention are tri-substituted ammonium salts such as:

trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium)tetraphenylborate,
trimethylammonium tetrakis(pentafluorophenyl)borate,
methylditetradecylammonium tetrakis(pentafluorophenyl)borate,
methyldioctadecylammonium tetrakis(pentafluorophenyl)borate,
triethylammonium tetrakispentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-triimethylanilinium) tetrakis(pentafluorophenyl)borate,
trimethylammonium tetrakis(2,3,4,6-tetrafluorophenylborate,
triethylammonium tetrakis(2,3,4,6-tetrafluorophenyl)borate,
tripropylammonium tetrakis(2,3,4,6-tetrafluorophenyl)borate,
tri(n-butyl)ammonium tetrakis(2,3,4,6-tetrafluorophenyl)borate,
dimethyl(t-butyl)ammonium tetrakis(2,3,4,6-tetrafluorophenyl)borate,
N,N-diethylanilinium tetrakis(2,3,4,6-tetrafluorophenyl)borate,
N,N-dimethylanilinium tetrakis(2,3,4,6-tetrafluorophenyl)borate, and
N,N-dimethyl-(2,4,6-trimethylanilinium) tetrakis-(2,3,4,6-tetrafluorophenyl)borate.

Dialkyl ammonium salts such as:
dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Preferred are tetrakis(pentafluorophenyl)borate salts of long chain alkyl mono- and disubstituted ammonium complexes, especially $C_{14}$–$C_{20}$ alkyl ammonium complexes, especially methyldi(octadecyl)ammonium tetrakis (pentafluorophenyl)borate and methyldi(tetradecyl) ammonium tetrakis(pentafluorophenyl)borate, or mixtures including the same Such mixtures include protonated ammonium cations derived from amines comprising two $C_{14}$, $C_{16}$ or $C_{18}$ alkyl groups and one methyl group. Such amines are available from Witco Corp., under the trade name Kemamine™ T9701, and from Akzo-Nobel under the trade name Armeen™ M2HT.

Another suitable ion forming, activating cocatalyst comprises a salt of a cationic oxidizing agent and a noncoordinating, compatible anion represented by the formula:

$$(Ox^{e+})_d(A^{d-})_e,$$

wherein:

$Ox^{e+}$ is a cationic oxidizing agent having charge e+;

e is an integer from 1 to 3; and $A^{d-}$, and d are as previously defined.

Examples of cationic oxidizing agents include: ferrocenium, hydrocarbyl-substituted ferrocenium, $Ag^{30}$, or $Pb^{+2}$. Preferred embodiments of $A^{d-}$ are those anions previously defined with respect to the Bronsted acid containing activating cocatalysts, especially tetrakis (pentafluorophenyl)borate.

Another suitable ion forming, activating cocatalyst comprises a compound which is a salt of a carbenium ion or silylium ion and a noncoordinating, compatible anion represented by the formula:

wherein:

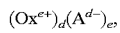+ is a $C_{1-20}$ carbenium ion or silylium ion; and

A− is as previously defined.

A preferred carbenium ion is the trityl cation, that is triphenylcarbenium. A preferred silylium ion is triphenylsilylium.

The activating technique of bulk electrolysis involves the electrochemical oxidation of the metal complex under electrolysis conditions in the presence of a supporting electrolyte comprising a noncoordinating, inert anion. In the technique, solvents, supporting electrolytes and electrolytic potentials for the electrolysis are used such that electrolysis byproducts that would render the metal complex catalytically inactive are not substantially formed during the reaction. More particularly, suitable solvents are materials that are: liquids under the conditions of the electrolysis (generally temperatures from 0 to 100° C.), capable of dissolving the supporting electrolyte, and inert. "Inert solvents" are those that are not reduced or oxidized under the reaction conditions employed for the electrolysis. It is generally possible in view of the desired electrolysis reaction to choose a solvent and a supporting electrolyte that are unaffected by the electrical potential used for the desired electrolysis. Preferred solvents include difluorobenzene (all isomers), DME, and mixtures thereof.

The electrolysis may be conducted in a standard electrolytic cell containing an anode and cathode (also referred to as the working electrode and counter electrode respectively). Suitably materials of construction for the cell are glass, plastic, ceramic and glass coated metal. The electrodes are prepared from inert conductive materials, by which are meant conductive materials that are unaffected by the reaction mixture or reaction conditions. Platinum or palladium are preferred inert conductive materials. Normally, an ion permeable membrane such as a fine glass frit separates the cell into separate compartments, the working electrode compartment and counter electrode compartment. The working electrode is immersed in a reaction medium comprising the metal complex to be activated, solvent, supporting electrolyte, and any other materials desired for moderating the electrolysis or stabilizing the resulting complex. The counter electrode is immersed in a mixture of the solvent and supporting electrolyte. The desired voltage may be determined by theoretical calculations or experimentally by sweeping the cell using a reference electrode such as a silver electrode immersed in the cell electrolyte. The background cell current, the current draw in the absence of the desired electrolysis, is also determined. The electrolysis is completed when the current drops from the desired level to the background level. In this manner, complete conversion of the initial metal complex can be easily detected.

Suitable supporting electrolytes are salts comprising a cation and an inert, compatible, noncoordinating anion, $A^-$. Preferred supporting electrolytes are salts corresponding to the formula: $G^+A^-$; wherein:

$G^+$ is a cation which is nonreactive towards the starting and resulting complex, and $A^-$ is a noncoordinating, compatible anion.

Examples of cations, $G^+$, include tetrahydrocarbyl substituted ammonium or phosphonium cations having up to 40 nonhydrogen atoms. A preferred cation is the tetra-n-butylammonium cation.

During activation of the complexes of the present invention by bulk electrolysis the cation of the supporting electrolyte passes to the counter electrode and $A^-$ migrates to the working electrode to become the anion of the resulting oxidized product. Either the solvent or the cation of the supporting electrolyte is reduced at the counter electrode in equal molar quantity with the amount of oxidized metal complex formed at the working electrode. Preferred supporting electrolytes are tetrahydrocarbylammonium salts of tetrakis(perfluoroaryl)borates having from 1 to 10 carbons in each hydrocarbyl group, especially tetra-n-butylammonium tetrakis(pentafluorophenyl)borate.

In general, the active catalyst can be prepared by combining the metal complex and activator in a suitable solvent at a temperature within the range from −100° C. to 300° C. The silane or hydrocarbylsilane adjuvant may be added separately or simultaneously with the remaining components. The catalyst composition may be separately prepared prior to addition of the monomers to be polymerized or prepared in situ by combination of the various components in the presence of the monomers to be polymerized. The catalysts' components are sensitive to both moisture and oxygen and should be handled and transferred in an inert atmosphere.

Preferred monomers for use herein include olefins having from 2 to 20,000, preferably from 2 to 20, more preferably from 2 to 8 carbon atoms and combinations of two or more of such olefins. Particularly suitable olefins include: ethylene, propylene, 1-butene, 1-pentene, 4methylpentene-1, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the olefins are ethylene, propene, 1-butene, 4-methyl-1-pentene, 1-hexene, 1-octene, styrene, halo- or alkyl substituted styrenes, and tetrafluoroethylene. Other suitable monomers include vinylcyclobutene, and dienes, such as 1,4-hexadiene, dicyclopentadiene, ethylidene norbornene, and 1,7-octadiene. Mixtures of the above-mentioned monomers may also be employed.

Suitable solvents or diluents for the catalyst preparation include any of the solvents known in the prior art including, but not necessarily limited to, straight and branched-chain hydrocarbons such as $C_{6-12}$ alkanes (pentane, hexane, heptane, octane and mixtures thereof); $C_{6-12}$ cyclic and alicyclic hydrocarbons such as cyclohexane, cycloheptane, methylcyclohexane, methylcycloheptane and mixtures thereof and $C_{6-12}$ aromatic and alkyl-substituted aromatic compounds such as benzene, toluene, xylene, decalin, and mixtures thereof, as well as mixtures of the foregoing compounds.

The polymerization may be conducted under slurry, solution, bulk, gas phase or suspension polymerization conditions or other suitable reaction conditions. The polymerization can be conducted at temperatures of from 0° C. to 160° C., preferably from 25° C. to 100° C. for a sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as super-atmospheric pressure, suitably at a pressure within the range of 1 to 500 psig (6.9 kPa–3,400 kPa). The use of ambient or low pressures, for example, 1–5 psig (6.9–34.5 kPa) is preferred in view of lower capital and equipment costs.

The polymerization may be conducted in the presence of an inert diluent or solvent or in the absence thereof, that is, in the presence of excess monomer. Examples of suitable diluents or solvents include $C_{6-20}$ aliphatic, cycloaliphatic, aromatic and halogenated aliphatic or aromatic hydrocarbons, as well as mixtures thereof. Preferred diluents comprise the $C_{6-10}$ alkanes, toluene and mixtures thereof. A particularly desirable diluent for the polymerization is iso-octane, iso-nonane or blends thereof such as Isopar-E™, available from Exxon Chemical Company. Suitable amounts of solvent are employed to provide a monomer concentration from 5 percent to 100 percent by weight.

The molar ratio of addition polymerizable monomer to catalyst (in terms of the Group 3–10 metal content) may range from 100:1 to $1\times10^{10}$:1, preferably from 1000:1 to $1\times10^{6}$:1. Typically in the preparation of ethylene/ olefin copolymers the molar ratio of comonomer to monomer(s) used in the polymerization depends upon the desired density for the composition being produced and is about 0.5 or less. Desirably, when producing materials with a density range of from about 0.91 to about 0.93 the comonomer to monomer ratio is less than 0.2, preferably less than 0.05, even more preferably less than 0.02, and may even be less than 0.01. Typically, the molar ratio of hydrogen to monomer in the process is less than about 0.5, preferably less than 0.2, more preferably less than 0.05, even more preferably less than 0.02, due to the presence of silane branching agent, which performs many of the functions of hydrogen with respect to molecular weight control. The molar ratio of silane or hydrocarbylsilane branching agent to monomer charged to the reactor is desirably less than about 0.5, preferably less than 0.2, and more preferably less than 0.1.

As in other similar polymerizations, it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, or a combination thereof may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, for example, extraction utilizing hot, high boiling chlorinated solvents, acids or bases such as caustic followed by filtration.

A support may be optionally present in the catalyst formulation especially in a gas phase or slurry polymerization. Suitable supports include any inert, particulate material, but most suitably is a metal oxide, preferably alumina, silica, or an aluminosilicate material. Suitable particle sizes are from 1 to 1000 $\mu$M, preferably from 10 to 100 $\mu$M. Most desired supports are calcined silica, which may be treated to reduce surface hydroxyl groups by reaction with a silane, or similar reactive compound. Any suitable means for including such support in the catalyst formulation may be used, such as by dispersing the components in a liquid and contacting the same with the support and thereafter drying, by spraying, or coating the support with such liquid and thereafter removing the liquid, or by coprecipitating the cocatalyst and a support material from a liquid medium.

The polymerization is desirably carried out as a continuous polymerization, in which catalyst components, monomer(s), chain branching agent, and optionally solvent and diene are continuously supplied to the reaction zone and polymer product continuously removed therefrom. Within the scope of the terms "continuous" and "continuously" as used in this context are those processes in which there are intermittent additions of reactants and removal of products at small regular intervals, so that, over time, the overall process is continuous.

In one embodiment of operation, the polymerization is conducted in a continuous solution polymerization system comprising two reactors connected in series or parallel. In one reactor a relatively high molecular weight product (Mw from 300,000 to 600,000, more preferably 400,000 to 500,000) is formed while in the second reactor a product of a relatively low molecular weight (Mw 50,000 to 300,000) is formed. The final product is a blend of the two reactor effluents which are combined prior to devolatilization to result in a uniform blend of the two polymer products. Such a dual reactor process allows for the preparation of products having improved properties. In a preferred embodiment the reactors are connected in series, that is effluent from the first reactor is charged to the second reactor and fresh monomer, solvent and hydrogen is added to the second reactor. Reactor conditions are adjusted such that the weight ratio of polymer produced in the first reactor to that produced in the second reactor is from 20:80 to 80:20. In addition the temperature of the second reactor is controlled to produce the lower molecular weight product. This system beneficially allow for production of EPDM products having a large range of Mooney viscosities, as well as excellent strength and processability. Preferably the Mooney viscosity (ASTM D1646-94, ML1+4 @ 125° C.) of the resulting product is adjusted to fall in the range from 1 to 200, preferably from 5 to 150 and most preferably from 10 to 110.

The polymerization process of the present invention can also be employed to advantage in the gas phase copolymerization of olefins. Such processes are used commercially on a large scale for the manufacture of high density polyethylene (HDPE), medium density polyethylene (MDPE), linear low density polyethylene (LLDPE) and polypropylene. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate, the fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having about 3 to about 8, preferably 4 to 6, carbon atoms. In the case that the monomer or comonomer itself is a volatile liquid, or can be condensed to provide such a liquid, this can suitably be fed to the bed to provide an evaporative cooling effect. Examples of olefin monomers which can be employed in this manner are olefins containing about three to about eight, preferably three to six carbon atoms.

The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP-89691; U.S. Pat. No. 4,543,399; WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032. For the teaching contained therein, the foregoing patents or publications, and their corresponding equivalent United States applications are hereby incorporated by reference.

The polymerization reaction occurring in the gas fluidized bed is catalyzed by the continuous or semi-continuous addition of catalyst. Such catalyst can be supported on an inorganic or organic support material as described above. The catalyst can also be subjected to a prepolymerization step, for example, by polymerizing a small quantity of olefin monomer in a liquid inert diluent, to provide a catalyst composite comprising catalyst particles embedded in olefin polymer particles.

The polymer is produced directly in the fluidized bed by catalyzed copolymerization of the monomer and one or more comonomers on the fluidized particles of catalyst, supported catalyst or prepolymer within the bed. Start-up of the polymerization reaction is achieved using a bed of preformed polymer particles, which are preferably similar to the target polyolefin, and conditioning the bed by drying with inert gas or nitrogen prior to introducing the catalyst, the monomers and any other gases which it is desired to have in the recycle gas stream, such as a diluent gas, hydrogen chain transfer agent, or an inert condensable gas when operating in gas phase condensing mode. The produced polymer is discharged continuously or discontinuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. The process readily removes any residual silane or hydrocarbylsilane branching agent, as well as inert diluents and unreacted monomers which may be recycled to the reactor if desired.

Typically, the fluidized bed of the gas phase process is operated at temperatures greater than 50° C., preferably from about 60° C. to about 110° C., more preferably from about 70° C. to about 110° C.

A number of patents and patent applications describe gas phase processes which are adaptable for use in the process of this invention, particularly, U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; 5,616,661; and EP applications 659,773; 692,500; 780,404; 697,420; 628, 343; 593,083; 676,421; 683,176; 699,212; 699,213; 721, 798; 728;150; 728,151; 728,771; 728,772; 735,058; and PCT Applications WO-94/29032, WO-94/25497, WO-94/25495, WO-94/28032, WO-95/13305, WO-94/26793, WO-95/07942, WO-97/25355, WO-93/111171, WO-95/13305, and WO-95/13306, all of which, or their corresponding equivalent United States applications are hereby incorporated herein by reference.

For the preferred polyolefin polymer compositions of this invention, which may be produced by the polymerization processes of this invention using the catalyst systems of this invention, the long chain branch is longer than the short chain branch that results from the incorporation of one or more α-olefin comonomers into the polymer backbone. The empirical effect of the presence of long chain branching in the polymers of this invention is manifested as enhanced rheological properties which are indicated by higher flow activation energies, and greater $I_{21}/I_2$ than expected from the other structural properties of the compositions.

Having described the invention, the following examples are provided as further illustrative and are not to be construed as limiting. The skilled artisan will appreciate that the invention disclosed herein may be practiced in the absence of any component which has not been specifically disclosed. Unless stated to the contrary, all parts and percentages are based on weight.

EXAMPLES 1–9

All reactions and manipulations were carried out under inert atmosphere in a dry box. Monomer and solvent were purified by passing through activated alumina and supported copper catalyst (Q5 reactant, available from Engelhardt Corporation, and otherwise handled using standard inert atmosphere techniques. The catalyst used in polymerizations 6 and 7 (catalyst B) was prepared in the following manner:

Preparation of Lithium 1H-Cyclopenta[I]phenanthrene-2-yl

To a 250 ml round bottom flask containing 1.42 g (0.00657 mole) of 1H-cyclopenta[I]phenanthrene and 120 ml of benzene was added dropwise, 4.2 ml of a 1.60 M solution of n-BuLi in mixed hexanes. The solution was allowed to stir overnight. The lithium salt was isolated by filtration, washing twice with 25 ml benzene and drying under vacuum. Isolated yield was 1.426 g (97.7 percent). 1H NMR analysis indicated the predominant isomer was substituted at the 2 position.

Preparation of (1H-Cyclopenta[I]phenanthrene-2-yl) dimethylchlorosilane

To a 500 ml round bottom flask containing 4.16 g (0.0322 mole) of dimethyldichlorosilane ($Me_2SiCl_2$) and 250 ml of tetrahydrofuran (THF) was added dropwise a solution of 1.45 g (0.0064 mole) of lithium 1H-cyclopenta[I] phenanthrene-2-yl in THF. The solution was stirred for approximately 16 hours, after which the solvent was removed under reduced pressure, leaving an oily solid which was extracted with toluene, filtered through diatomaceous earth filter aid (Celite™), washed twice with toluene and dried under reduced pressure. Isolated yield was 1.98 g (99.5 percent).

Preparation of (1H-Cyclopenta[I]phenanthrene-2-yl) dimethyl(t-butylamino)silane

To a 500 ml round bottom flask containing 1.98 g (0.0064 mole) of (1H-cyclopenta[I] phenanthrene-2-yl) dimethylchlorosilane and 250 ml of hexane was added 2.00 ml (0.0160 mole) of t-butylamine. The reaction mixture was allowed to stir for several days, then filtered using diatomaceous earth filter aid (CeliteTM), washed twice with hexane. The product was isolated by removing residual solvent under reduced pressure. The isolated yield was 1.98 g (88.9 percent).

Preparation of Dilithio(1H-cyclopenta[I]phenanthrene-2-yl) dimethyl(t-butylamido)silane To a 250 ml round bottom flask containing 1.03 g (0.0030 mole) of (1H-20 cyclopenta[I]phenanthrene-2-yl)dimethyl (t-butylamino)silane) and 120 ml of benzene was added dropwise 3.90 ml of a solution of 1.6 M n-BuLi in mixed hexanes. The reaction mixture was stirred for approximately 16 hours. The product was isolated by filtration, washed twice with benzene and dried under reduced pressure. Isolated yield was 1.08 g (100 percent).

Preparation of (1H-Cyclopenta[I]phenanthrene-2-yl) dimethyl(t-butylamido)silanetitanium Dichloride.

To a 250 ml round bottom flask containing 1.17 g (0.0030 mole) of $TiCl_3$.3THF and about 120 ml of THF was added at a fast drip rate about 50 ml of a THF solution of 1.08 g of dilithio(1H-cyclopenta[I]phenanthrene-2-yl)dimethyl(t-butylamido)silane. The mixture was stirred at about 20° C. for 1.5 h at which time 0.55 gm (0.002 mole) of solid $PbCl_2$ was added. After stirring for an additional 1.5 h the THF was removed under vacuum and the reside was extracted with toluene, filtered and dried under reduced pressure to give an orange solid. Yield was 1.31 g (93.5 percent).

Preparation of (1H-cyclopenta[I]phenanthrene-2-yl) dimethyl(t-butylamido)silanetitanium 1,4-Diphenylbutadiene To a slurry of (1H-cyclopenta[I]phenanthrene-2-yl) dimethyl(t-butylamido)silanetitanium dichloride (3.48 g, 0.0075 mole) (produced by scaling up Example 1) and 1.551 gm (0.0075 mole) of 1,4-diphenyllbutadiene in about 80 ml of toluene at 70° C. was add 9.9 ml of a 1.6 M solution of n-BuLi (0.0150 mole). The solution immediately darkened. The temperature was increased to bring the mixture to reflux and the mixture was maintained at that temperature for 2 hrs. The mixture was cooled to about −20° C. and the volatiles were removed under reduced pressure. The residue was slurried in 60 ml of mixed hexanes at about 20° C. for approximately 16 hours. The mixture was cooled to about −25° C. for about 1 h. The solids were collected on a glass frit by vacuum filtration and dried under reduced pressure. The dried solid was placed in a glass fiber thimble and solid extracted continuously with hexanes using a soxhlet extractor. After 6 h a crystalline solid was observed in the boiling pot. The mixture was cooled to about −20° C., isolated by filtration from the cold mixture and dried under reduced pressure to give 1.62 g of a dark crystalline solid. The filtrate was discarded. The solids in the extractor were stirred and the extraction continued with an additional quantity of mixed hexanes to give an additional 0.46 gm of the desired product as a dark crystalline solid.

Metal complex B may be depicted by the following schematic structure:

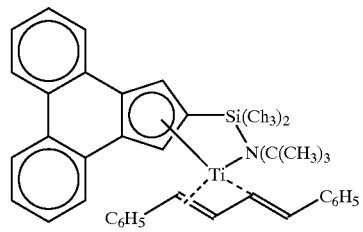

Polymerizations are conducted in a two-liter Parr reactor that is charged with Isopar-E™ mixed alkanes solvent (available from Exxon Chemicals Inc.) and the desired quantity of comonomer(s). Silane ($SiH_4$) is added by differential pressure expansion from a 75 mL addition tank. The reactor is heated to the desired initial reaction temperature and allowed to stabilize. The desired amount of catalyst and cocatalyst (trispentafluorophenylborane) as solutions in toluene are premixed in the drybox to give a 1:1 molar ratio of catalyst and cocatalyst and charged to the polymerization reactor through a stainless steel transfer line using nitrogen and a toluene "chaser". The polymerization conditions are maintained for the indicated reaction periods with ethylene on demand using periodic catalyst additions to maintain polymerization activity. Heat is continuously removed from the reaction through an internal cooling coil. After polymerization for the indicted times, the resulting solution is removed from the reactor, quenched with isopropyl alcohol, and stabilized by addition of a hindered phenol antioxidant (Irganox™ 1010 from Ciba Geigy Corporation). The solvent is removed in a vacuum oven set at 140° C. by heating the polymer solution for about 16 hours. Results are shown in Table 1.

TABLE I

| Ex. | Catalyst ($\mu$mole) | Temp. (° C.) | time (min.) | silane ($\Delta$ MPa) | $C_2H_4$ (MPa) | $C_3H_7$ (g) | styrene (g) | Isopar (g) | yield (g) | Mw ×10$^6$ | Mn ×10$^6$ | Mz ×10$^6$ |
|---|---|---|---|---|---|---|---|---|---|---|---|---|
| 1 | A (1.3) | 140 | 22.5 | 0.3 | 3.4 | 0 | 0 | 860 | 15.5 | 575 | 249 | 988 |
| 2 | A (1.5) | " | 15.4 | 0.7 | " | " | " | " | 7.3 | 466 | 182 | 761 |
| 3 | A (6.3) | " | 30.5 | 1.4 | " | " | " | " | 11.2 | 434 | 186 | 732 |
| 4 | A (8.0) | 90 | 30.5 | 0.7 | 1.4 | " | 456 | 360 | 61.7 | 124 | 48 | 214 |
| 5 | A (8.0) | " | 30.6 | 1.4 | " | " | " | " | 47.3 | 92 | 47 | 145 |
| 6 | B (7.0) | " | 30.6 | 0.7 | " | " | " | " | 59.5 | 107 | 50 | 260 |
| 7 | B (20.0) | " | 51.7 | 1.4 | " | " | " | " | 69.2 | 76 | 34 | 234 |
| 8 | C (6.0) | 70 | 15.8 | 0.7 | 0 | 150 | 0 | 650 | 76.9 | 12 | 6 | 19 |
| 9 | C (6.0) | " | 14.2 | 1.4 | " | " | " | " | 82.4 | 10 | 6 | 15 |

A = (t-butylamido)(tetramethylcyclopentadienyl)dimethylsilanetitanium (1,3-pentadiene)
B = (1H-cyclopenta[l]phenanthrene-2-yl)dimethyl(t-butylamido)silanetitanium 1,4-diphenylbutadiene
C = (1,2-ethylene bis(1-indenyl)) zirconium (trans, trans-1,4-diphenyl-1,3-butadiene)

EXAMPLES 10–13
Continuous Gas Phase Polymerizations

Continuous gas phase polymerizations are carried out in a 6 liter gas phase reactor having two inch diameter 12 inch long fluidization zone and an eight inch diameter eight inch long velocity reduction zone which are connected by a transition section having tapered walls. Typical operating conditions ranged from 40 to 100° C., 100 to 350 psia total pressure and up to 8 hours reaction time. Monomer, comonomer, and other gases entered the bottom of the reactor where they passed through a gas distributor plate. The flow of the gas was 2 to 8 times the minimum particle fluidization velocity [*Fluidization Engineering*, 2nd Ed., D. Kunii and O. Levenspiel, 1991, Butterworth-Heinemann]. Most of the suspended solids disengaged in the velocity reduction zone. The gases exited the top of the velocity reduction zone and passed through a dust filter to remove any fines. The gases then passed through a gas booster pump. The polymer was allowed to accumulate in the reactor over the course of the reaction. The total system pressure was kept constant during the reaction by regulating the flow of monomer into the reactor. Polymer was removed from the reactor to a recovery vessel by opening a series of valves located at the bottom or the fluidization zone thereby discharging the polymer to a recovery vessel kept at a lower pressure than the reactor. The pressures of monomer, comonomer and other gases reported refer to partial pressures.

The catalyst is prepared and loaded into a catalyst injector in an inert atmosphere glovebox. The injector is removed from the glovebox and inserted into the top of the reactor. Appropriate amounts of monomer, comonomer and other gases are introduced into the reactor to bring the total pressure up to the desired reaction pressure. The catalyst is then injected and the polymer allowed to accumulate for 30 to 90 minutes. The total system pressure is kept constant during the reaction by regulating the flow of monomer into the reactor. After 30 to 90 minutes the reactor is emptied and the polymer powder collected.

EXAMPLE 10

15.9 grams of Crosfield type ES70Y silica (surface area= 315 m$^2$/g and a Malvern particle size [D50]=106.8 $\mu$m) are heated at 500° C. for 4 hours in an inert stream of nitrogen. The silica is allowed to cool to room temperature in an inert stream of nitrogen. The silica calcination tube is then sealed at both ends and brought into an inert atmosphere glovebox. The silica is removed from the calcination tube then slurried with 80 ml. of hexane at a ratio of 5 ml. hexane/gram silica. To the slurried silica is added 2.93 grams of a 93 precent by weight solution of triethylaluminum (TEA) which corresponded to a treatment of 1.5 mmoles TEA/gram silica. The slurry is allowed to sit for 2 hours with gentle agitation by hand every 15 to 20 minutes. After 2 hours the silica is filtered and washed twice with a total of 100 ml. of hexane to remove any soluble aluminum compounds which may have resulted during the TEA treatment step. The silica is then dried at room temperature under vacuum to give a free-flowing powder.

An aliquot (160 $\mu$l) of a 0.005 M solution (0.8 $\mu$mol) of ($\eta^5$-C$_5$Me$_4$SiMe$_2$NCMe$_3$)—Ti($\eta^4$-C$_5$H$_8$) in toluene is combined with 0.03 grams of the pretreated Crosfield type ES70Y silica described above which had already been prewetted with ~200 $\mu$l of dry toluene. An aliquot (180 $\mu$l) of a 0.005 M solution (0.9 $\mu$mol) of B(C$_6$F$_5$)$_3$ in toluene is then added to the slurried silica. The solvent is removed to give a free-flowing powder. The formulated catalyst described above is added to the gas phase fluid bed reactor which is under an ethylene pressure of 240 psi (1.7 MPa), a 1-butene pressure of 5 psi (34 kPa), a tetrahydrosilane pressure of 2 psi (14 kPa) and a nitrogen pressure of 50 psi (340 kPa). The temperature throughout the polymerization was 70° C. The resulting recovered polymer contains at least 4.0 long chain branches per 10,000 carbons by NMR analysis.

EXAMPLE 11

An aliquot (200 $\mu$l) of a 0.005 M solution of [1,2-ethylanediyl bis(1-indenyl)]zirconium(s-trans-trans,trans-1, 4-diphenyl-1,3-butadiene) in toluene is combined with 0.03 grams of the pretreated Crosfield ES70Y silica described in example 10 which had been prewetted with 200 $\mu$l of toluene. An aliquot (220 $\mu$l) of a 0.005 M solution of tris(pentafluorophenyl)borane is then added to this slurry. After 10 minutes of shaking this mixture, the solvent is removed under vacuum to give a free flowing powder.

The formulated catalyst described above is added to the gas phase fluid bed reactor under an ethylene pressure of 240 psi (1.7 MPa), a 1-butene pressure of 5 psi (34 kPa), a silane pressure of 2 psi (14 kPa), and a nitrogen pressure of 50 psi (340 kPa). The temperature throughout the polymerization is maintained at 70° C. Polyethylene polymer is recovered after 30 minutes containing long chain branching.

EXAMPLE 12

An aliquot (400 $\mu$l) of a 0.00500 M solution of [1,2-ethylanediyl bis(1-indenyl)]zirconium(s-trans-trans,trans-1, 4-diphenyl-1,3-butadiene) in toluene is combined with 0.03 grams of the pretreated Crosfield ES70Y silica described in example 10 which had been prewetted with 200 μl of toluene. An aliquot (420 μl) of a 0.005 M solution of tris(pentafluorophenyl)borane is then added to this slurry. After 10 minutes of shaking the solvent is removed under vacuum to give a free flowing powder.

The formulated catalyst described above is added to the gas phase fluid bed reactor which was under a propylene pressure of 100 psi (700 kPa), a silane pressure of 2 psi (14 kPa), and a nitrogen pressure of 20 psi (140 kPa). The temperature throughout the polymerization was 70 C. Crystalline polypropylene polymer is recovered after 60 minutes that contains long chain branching.

EXAMPLE 13

Crosfield type ES70 silica (particle size=40 μm) is heated at 250° C. for 4 hours in an inert stream of nitrogen. The silica is allowed to cool to room temperature in an inert stream of nitrogen. The silica calcination tube is then sealed at both ends and brought into an inert atmosphere glovebox. The silica is removed from the calcination tube, then 5 grams is slurried in a solution of 5 ml of triethylaluminum (TEA) in 50 ml. of hexanes. The slurry is allowed to sit for 15 minutes with occasional gentle agitation by hand. The silica is then filtered and washed three times with a total of 150 ml. of hexane to remove any soluble aluminum compounds which may have resulted during the TEA treatment step. The silica is then dried at room temperature under vacuum to give a free-flowing powder.

To 0.400 ml of a 0.150 M solution of TEA is added to 0.400 ml of toluene. To this solution is added 0.400 ml of a 0.150 M solution of methyldi(octadecyl)ammonium tris (pentafluorophenyl)(4-hydroxyphenyl)borate in toluene. This solution is allowed to stand for 10 minutes and is then added to 1.000 grams of the pretreated silica described above. The mixture is thoroughly mixed and allowed to stand for 5 minutes at which time 10 ml of hexanes is added. To this mixture is added a solution consisting of 33.2 mg of [bis(2-methyl-4-phenyl-1-indenyl) dimethylsilane] zirconium(s-trans-trans,trans-1,4-diphenyl-1,3-butadiene) in 10 ml hexanes. The resulting mixture is then shaken. After twenty hours, the supernatant is carefully decanted from the settled solids. 12 ml hexanes are then added to the solids. The slurry is divided in half and only half is used for the remainder of the example. 12.5 ml of propylene saturated hexanes is added to half of the slurry and stirred for 5 minutes. The supernatant is decanted from the settled solids. The volatile materials are allowed to evaporate from the solid in the glovebox.

The formulated catalyst described above is added to the gas phase fluid bed reactor under a propylene pressure of 100 psi (700 kPa), a silane pressure of 2 psi (14 kPa), and a nitrogen pressure of 20 psi (300 kPa). The temperature throughout the polymerization is 70° C. Crystalline polypropylene polymer is recovered containing long chain branching.

EXAMPLE 14

A. Preparation of Catalyst Components
1. Preparation of the Hydrochloride of Kemamine™ T9701
Kemamine™ T9701, (NMe($C_{18-22}H_{37-45}$)$_2$ (13.4 gram, 25 mmol), available from Witco Corp. (Kemamine is a trademark of Witco Corp.) was dissolved in diethylether (300 ml). Hydrogen chloride gas was bubbled through the solution for 5 minutes, until the pH was acidic as shown by pH paper. The mixture was stirred for 15 minutes and the white precipitate was collected by filtration, washed with three 50 ml portions of diethylether and dried under vacuum. The yield of the NHClMe($C_{18-22}H_{37-45}$)$_2$ was 12.6 gram.
2. Preparation of [(p-HOC$_6$H$_4$)B(C$_6$F$_5$)$_3$][NHMe (C$_{18-22}$H$_{37-45}$)$_2$]

NHClMe($C_{18-22}H_{37-45}$)$_2$ (4.58 gram, 8 mmol) was dissolved in dichloromethane (50 ml). Triethylammonium tris (pentafluorophenyl)(4-hydroxyphenyl)borate [(p-HOC$_6$H$_4$) B(C$_6$F$_5$)$_3$][NHEt$_3$] (5.66 gram, 8 mmol, prepared as substantially described in Example 1B of U.S. patent application Ser. No. 08/610,647, filed Mar. 4, 1996 (corresponding to WO-96/28480)) was added followed by 40 ml distilled water. The mixture was rapidly agitated for 4 hours and then the water layer was removed by syringe. The dichloromethane layer was washed three times with 40 ml portions of distilled water. The dichloromethane layer was then dried over sodium sulfate, filtered and vacuum dried to yield an oil. The oil was extracted into toluene (200 ml), the resulting solution was filtered and the filtrate was vacuum dried to yield 8.84 gram of colorless oil.
3. Preparation of Catalyst Support 40 gram of silica SP12 (Grace Davison XPO 2402) which had been heated at 250° C. for 3 hours under vacuum was slurried in toluene (400 ml) and then treated with 40 ml of triethyl aluminum (TEA) in 250 ml toluene. The mixture was stirred for 1 hour, filtered and the treated silica was washed with toluene (100 ml, at about 100° C.) and dried under high vacuum.
B. Preparation of Supported Catalyst 0.4 ml of a 0.1 M solution of [(p-HOC$_6$H$_4$)B(C$_6$F$_5$)$_3$] [NHMe($C_{18-22}H_{37-45}$)$_2$] in toluene was mixed for about ten minutes with 0.4 ml of a 0.1 M solution of triethyl aluminum in toluene and 0.4 ml of toluene was added. The resulting solution was divided into three portions and sequentially added to 1 g of the TEA treated silica. The resulting mixture was shaken and 20 ml of hexane added with further shaking. After drying for 30 minutes in vacuum 33.2 mg of Rac-dimethylsilanebis(2-methyl-4-phenyl-inden-1-yl)zirconium 1,4-diphenyl-1,3-butadiene (prepared according to U.S. Pat. No. 5,278,264) dissolved in 1.2 ml of toluene was added to the silica with agitation. The resulting catalyst was then washed with hexane and dried. The catalyst was found to contain 35 μmoles of Zr/g of support.
C. Polymerization A 2 L Parr reactor was heated to 70° C. and charged with 270 g of propylene and pressured with 0.14 L of hydrogen. 7-Octenylsilane (containing about 14.6 percent of 6-octenylsilane) 0.13 wt percent based on total monomer content, dissolved in 0.5 ml of toluene and pressured to 100 psig over the reactor pressure with N$_2$ was charged to the vessel. To the vessel was then added 12 μmoles of the Zr-containing catalyst, slurried in hexane under N$_2$ pressure of 100 psig above the reactor pressure to initiate the polymerization. The polymerization was continued for 30 minutes and resulted in the formation of 45.3 g of octenylsilane modified polypropylene. The polymer had a mwt of 459,000 and a MWD of 3.2. The copolymer contained added LCB as shown by the increase in solution viscosity as a function of increased absolute molecular weight and an increase in the strain-hardening in extensional flow as a function of extension rate when compared to a polypropylene made under comparative conditions. Based on such analysis the octenylsilane-containing polymer has from 0.2 to 0.5 tetrafunctional branch sites/chain.

EXAMPLE 15

Using the catalyst and polymerization procedure of Example 14, 0.25 weight percent of the octenylsilane was copolymerized with the propylene to give 28.7 g of an 7-octenylsilane-modified polypropylene. The polymer had a mwt of 440,000 and a molecular weight distribution (MWD) of 3.4. The copolymer contained added LCB as shown by the increase in solution viscosity as a function of increased absolute molecular weight and an increase in the strain-hardening in extensional flow as a function of extension rate when compared to a polypropylene made under comparative conditions. Based on such analysis the octenylsilane-containing polymer has from 0.2 to 0.5 tetrafunctional branch sites/chain.

EXAMPLE 16

Using the catalyst and polymerization procedure of Example 14, 0.5 weight percent of the octenylsilane was copolymerized with the propylene to give 4.8 g of an 7-octenylsilane-modified polypropylene. The polymer had a mwt of 335,000 and a MWD of 4.2. The copolymer contained added LCB as shown by the increase in solution viscosity as a function of increased absolute molecular weight and an increase in the strain-hardening in extensional flow as a function of extension rate when compared to a polypropylene made under comparative conditions. Based on such analysis the octenylsilane-containing polymer has from 0.2 to 0.5 tetrafunctional branch sites/chain.

EXAMPLE 17 (COMPARATIVE)

Using the catalyst and polymerization procedure of Example 14, propylene was polymerized in the absence of silane to give 45.3 g of polypropylene. The polymer had a mwt of 351,000 and a MWD of 2.8.

What is claimed is:

1. A process for preparing homopolymers or copolymers of addition polymerizable monomers, or mixtures of such monomers, the process comprising contacting said monomer or mixture under high monomer conversion polymerization conditions with a catalyst composition comprising:

a) a catalyst system comprising a Group 3–10 metal complex; and c) a hydrocarbylsilane corresponding to the formula:

$$A_n J_j SiH_{4-(n+j)}$$

wherein:
   J is $C_{1-40}$ hydrocarbyl,
   A is a $C_{2-20}$ alkenyl group,
   n is 1 or 2, and
   j is 0 or 1;
   wherein the polymer comprises from 0.1 to 100 long chain branches per 10,000 carbons, at least some of which comprise a silane branching center.

2. A process according to claim 1 wherein the hydrocarbylsilane is 7-octenylsilane.

3. A process according to claim 1 wherein the number of long chain branches is from 0.3 to 10 per 10,000 carbons.

* * * * *